H. HIRZEL.
PROCESS OF RECOVERING PURIFYING MATERIALS.
APPLICATION FILED JUNE 30, 1908.
913,500.
Patented Feb. 23, 1909.
2 SHEETS—SHEET 1.
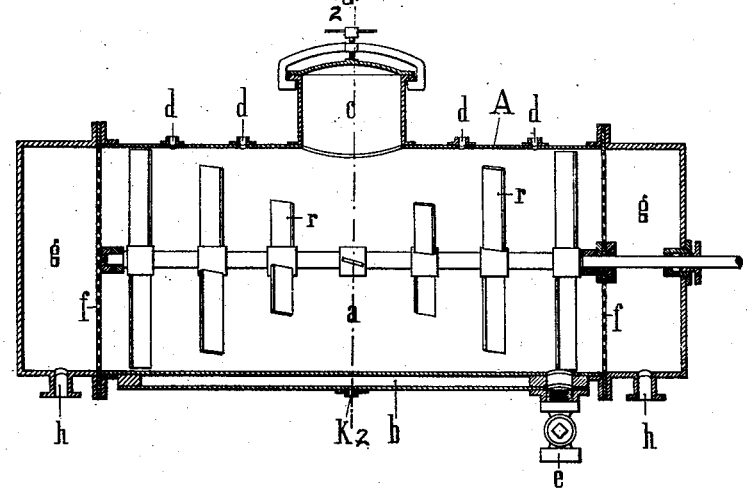
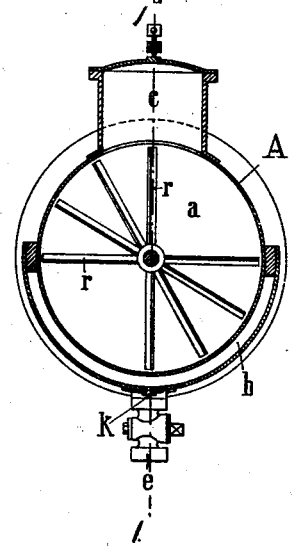

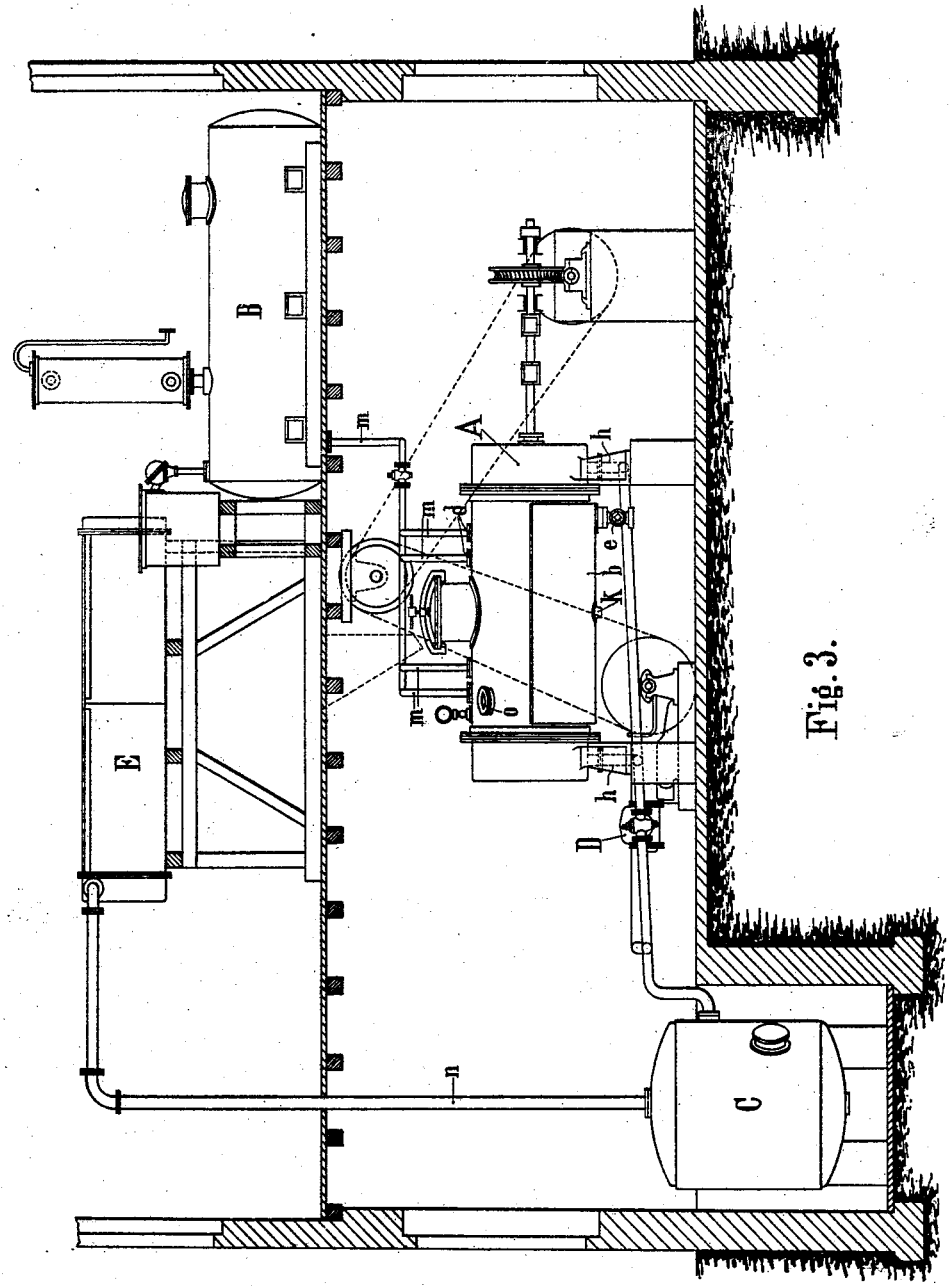

UNITED STATES PATENT OFFICE.

HEINRICH HIRZEL, OF LEIPZIG-PLAGWITZ, GERMANY.

PROCESS OF RECOVERING PURIFYING MATERIALS.

No. 913,500.   Specification of Letters Patent.   Patented Feb. 23, 1909.

Application filed June 30, 1908. Serial No. 441,235.

*To all whom it may concern:*

Be it known that I, HEINRICH HIRZEL, a citizen of the German Empire, and a resident of Leipzig-Plagwitz, Germany, have invented certain new and useful Improvements in Processes of Recovering Purifying Materials, whereof the following is a full, clear, and exact description.

This invention relates to processes of recovering purifying materials and comprises a method of recovering solid purifying materials which have been used for purifying oils and other liquids and which are charged with oil, or other liquids and impurities, by methodically extracting the purifying materials with solvents capable of dissolving away the residual liquid and impurities therefrom; all as more fully hereinafter set forth and as claimed.

In the bleaching and purifying of mineral oils, fatty oils and other liquids, it is customary to heat, stir or otherwise treat such liquids with solid purifying materials in a powdered or granular form, hydrous silicates of alumina, fuller's earth, "beaching clays", boneblack and many other substances being used for this purpose. Coloring matters and many other impurities are extracted by these purifying materials. At the end of the operation, the liquid is separated from the solid purifying materials by decantation, filtering or pressure and such residual material, charged with impurities, residual liquid, etc., is then usually burned or charred to regain the purifying material in a form suitable for reuse.

It is the object of the present invention to provide a cheap, simple and ready method of recovering used materials of this character, avoiding the loss of valuable substances incident to burning or charring and the deterioration of the character of the purifying material which also usually occurs in burning or charring; said method being also applicable to other oleaginous material, such as ground oil seeds, wool fat refuse and the like. The material which is usually in the form of a cake or mud, is placed in an apparatus provided with suitable stirring means and heating means, and is stirred and heated while small portions of a solvent are continuously introduced into the mass at a plurality of points, the flow of solvent being small while the stirring is relatively vigorous. This results in a uniform dilution of the contained liquid by the inflowing solvent, the stirring insuring that this dilution shall not be localized, and as the mass of diluted liquid increases in volume the excess beyond the amount necessary to form a paste or plastic mass with solid material, is drained off through filtering devices. By making the introduction of the solvent relatively slow while stirring and heating are maintained, the amount of solvent necessary to replace the liquid in the pores of the mass is rendered minimal while the drained-off portion is relatively rich in such liquid. In treating moist materials, such as the stated purifying residues, oil seeds, wool fat residues, etc., in this manner the contained moisture goes off with the first drained-off portions. The mass being stirred and drained should not be allowed to become more than thinly fluid or pasty at any time.

In the accompanying illustration I have shown, more or less diagrammatically, certain apparatus useful in the described process.

In this showing: Figure 1 is a longitudinal vertical section of an extraction apparatus taken along line 1—1 of Fig. 2; Fig. 2 is a transverse section of the same apparatus taken along line 2—2 of Fig. 1; and Fig. 3 is a view, mostly in elevation, of a complete apparatus comprising the extractor.

The extractor (Figs. 1 and 2) as shown comprises a vessel A provided with a plurality of solvent inlets $d$, a stirrer $r$, a manhead $c$ and two end-compartments $g$, separated from the main chamber $a$ by filtering devices $f$. The outlets $h$ allow liquid to be removed from these compartments. The chamber is also provided with a heating jacket $b$, having a steam inlet K. Gated outlet $e$ allows recovered purifying material to be removed from the chamber. Element $o$ (Fig. 3) is a window allowing observation of the material under treatment.

In the complete apparatus, as shown in Fig. 3, the solvent inlets $d$ are connected to a common solvent main $m$ leading from solvent reservior B. The outlets $h$ are connected to a still C, and a pump D is inserted in the connection if desired. Solvent distilled from the diluted liquid in C rises through $n$, is condensed in condenser E and returns to solvent reservoir B. Extractor, still, condenser and reservoir are conveniently situated, as shown, on different levels appropriate for facilitating flow of solvent.

In the use of the described apparatus, the purifying material to be recovered is placed within chamber *a* through the manhole and the stirrer started. As shown, this stirrer has propeller blades set to force the material from the middle towards the filtering partitions *f*, through which the excess of liquid escapes, keeping such material in constant circulation. As liquid escapes, small portions of solvent are introduced into various portions of the stirred mass through inlets *d*, and permeate it, diluting the contained liquid. The dilution of course increases the volume of the liquid and the excess escapes through *f* continuously. To facilitate the operation, the vessel is heated preferably almost to the boiling point of the particular solvent employed. The solvent may be any of the ordinary volatile solvents used for dissolving oils, such as benzin, benzol, ether, carbon disulfid, trichlorethylene, etc., or such solvents of other liquids usually purified by solid purifying materials, as water, alcohol, etc.

Assuming that the material to be treated is a pastelike mixture of oil and powdered solid, such as would result as a residue in purifying mineral oil of 0.880 sp. g., with a finely ground or levigated "bleaching clay," or hydrous silicate of alumina: about 4500 kg. of such material may be charged into an extracting vessel of about 9,000 liters capacity and the charging orifice closed. The stirrer is then slowly rotated at a rate of about 10 revolutions per minute and the mass heated to a point approximately the boiling point of the solvent used, which, in this case may be benzin. When benzin which is not too volatile is used, the temperature may be about 100° C.; with the trichlorethylene, about 80° C. Solvent is admitted from the reservoir B, which for the stated operation may be a tank of about 6,000 liters capacity. The oil permeating the mass is almost instantly diluted by the benzin and the mass converted into a thin paste while oil solution begins escaping in a clear state through the lateral cloth filters *f*, which are kept free and unclogged by the movement of the mass. The solution goes through into the still, its movement being accelerated, if desired, by pump D. D may be used to prevent pressure in the apparatus or to produce, if desired, a slight vacuum therein.

Fresh benzin is admitted in quantity corresponding to that of the oil solution drawn off, the flow being so regulated as to keep the mass a thinly fluid paste or magma having, for example, about a third part benzin to every part of the solid matter under treatment. The progress of the operation may be watched through glasses *o*. The liquid withdrawn is distilled in C and the volatilized benzin condensed for reuse. The same quantity of benzin may circulate through the apparatus cyclically.

The operation is considered complete when examination of the escaping liquid shows no, or very little, oil. Introduction of solvent is discontinued while the stirrer, pump and heating means continue to operate, the temperature being gradually raised to, say, 130° to 140° C. The residue of benzin in the solid mass is quickly expelled and sent through the still, leaving the mass in an absolutely dry condition, and as a fine grained dust if such were its original condition. This dry dustlike or fine grained powder may readily be removed through *e*, being carried there by the stirrer. In the case of such purifying material used on mineral oils as above stated, the operation will usually take about six hours for the extraction proper and four hours for the drying. For a very complete extraction, the extracting stage may be prolonged 20 minutes or so. A typical saturated waste purifying material thus treated gave the following results after extraction: 57.30 per cent. clear extracted mineral oil; 42.50 per cent. dry recovered silicate, free from oil; 0.20 per cent loss, moisture, etc. The loss of benzin amounted to about 1.4 per cent. of the mass treated.

What I claim is,

1. The process of recovering purifying materials which comprises heating and stirring a mass of such materials, the temperature being maintained below the boiling point of the solvent to be used slowly adding fresh solvent for impurities therein contained, said solvent being added at a plurality of points in the mass in amount only sufficient to maintain the mass in a plastic condition, and removing charged solvent from the mass at a rate about equivalent to the rate of addition, said addition and removal being continued till soluble impurities are substantially removed.

2. The process of recovering purifying materials which comprises heating and stirring a mass of such materials, the temperature being maintained below the boiling point of the solvent to be used slowly adding fresh solvent for impurities contained therein, said solvent being added at a plurality of points in the mass in amount only sufficient to maintain the mass in a plastic condition, removing charged solvent from the mass at a rate about equivalent to the rate of addition, said addition and removal being continued till soluble impurities are substantially removed, and recovering the solvent for reuse.

3. The process of recovering purifying materials which comprises heating and stirring a mass of such material within a vessel provided with a foraminous partition the temperature being maintained below the boiling point of the solvent to be used, slowly adding solvent for impurities contained in such mass in amount only sufficient to maintain the mass in a plastic condition, said solvent being added to the mass at a plurality of points, and withdrawing charged solvent through said foraminous partition at a rate about equivalent to the rate of addition, said addition and removal being continued till soluble impurities are substantially removed.

4. The process of recovering purifying materials which comprises heating and stirring a mass of such material within a vessel provided with a foraminous partition the temperature being maintained below the boiling point of the solvent to be used, slowly adding solvent for impurities contained in such mass in amount only sufficient to maintain the mass in a plastic condition, said solvent being added to the mass at a plurality of points, withdrawing charged solvent through said foraminous partition at a rate about equivalent to the rate of addition, said addition and removal being continued till soluble impurities are substantially removed, and recovering the solvent for reuse.

In testimony whereof I have signed this specification in the presence of two subscribing witnesses.

HEINRICH HIRZEL.

Witnesses:
LUDWIG WERSCHKY,
RUDOLPH FRICKE.